United States Patent [19]

Goto

[11] Patent Number: 5,591,682
[45] Date of Patent: Jan. 7, 1997

[54] LOW EXPANSION TRANSPARENT GLASS-CERAMIC

[75] Inventor: Naoyuki Goto, Sagamihara, Japan

[73] Assignee: Kabushiki Kaisya Ohara, Japan

[21] Appl. No.: 458,345

[22] Filed: Jun. 2, 1995

[30] Foreign Application Priority Data

Sep. 13, 1994 [JP] Japan ..................................... 6-244683
Oct. 26, 1994 [JP] Japan ..................................... 6-285920

[51] Int. Cl.$^6$ ........................................................ C03C 10/14
[52] U.S. Cl. ............................ 501/4; 501/7; 501/63; 501/70
[58] Field of Search ................................ 501/4, 7, 63, 70

[56] References Cited

U.S. PATENT DOCUMENTS

| | | | |
|---|---|---|---|
| 3,928,229 | 12/1975 | Neuroth | 501/7 X |
| 4,755,488 | 7/1988 | Nagashima | 501/4 |
| 4,835,121 | 5/1989 | Shibuya et al. | 501/4 |
| 5,064,460 | 11/1991 | Aitken | 501/3 X |
| 5,336,643 | 8/1994 | Goto et al. | 501/7 X |

*Primary Examiner*—Karl Group
*Attorney, Agent, or Firm*—Hedman, Gibson & Costigan, P.C.

[57] ABSTRACT

A low expansion glass-ceramic which has a coefficient of thermal expansion ($\alpha \times 10^{-7}/°C.$) within the range of from $-5$ to $+5$ within a temperature range of from $-60°$ C. to $+160°$ C., has a remarkably reduced variation of 10 ppm or below in relative length of $\Delta l/l$, has an excellent optical homogeneity owing to reduced melting temperature in the base glass, and has an improved transparency is obtained by restricting the ratio in weight of $P_2O_5$ to $SiO_2$ within the range of from 0.08 to 0.20, and adding $Li_2O$, $MgO$, $ZnO$, $CaO$ and $BaO$ of specific content ranges as essential ingredients in a base glass of a $SiO_2$-$P_2O_5$-$Al_2O_3$-$Li_2O$ system containing $TiO_2$ and $ZrO_2$ as nucleating agents, and $As_2O_3$ as an optional ingredient.

4 Claims, 1 Drawing Sheet

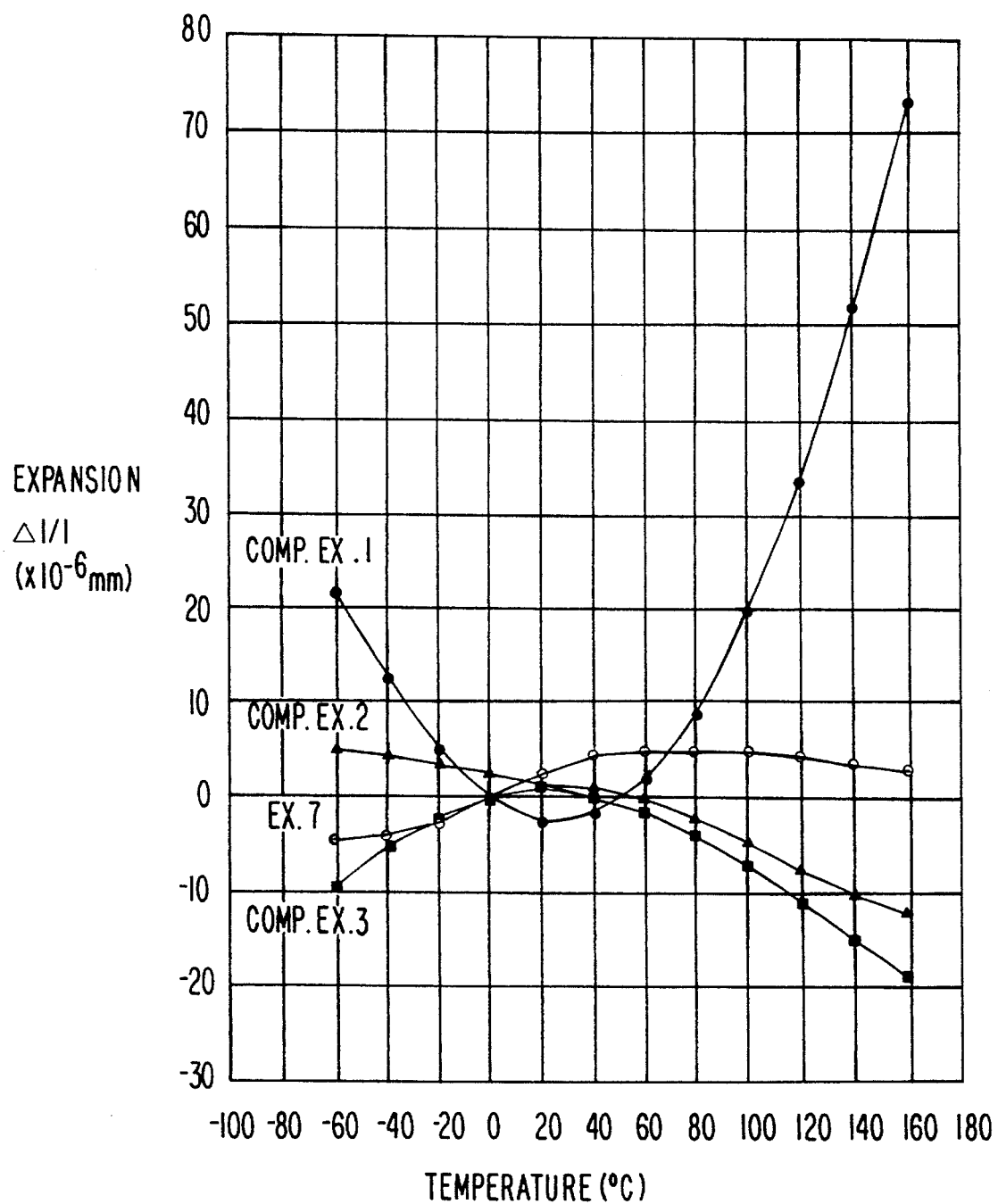

LOW EXPANSION TRANSPARENT GLASS-CERAMIC

BACKGROUND OF THE INVENTION

1. Field of the Invention

This invention relates to a low expansion transparent glass-ceramic suitable for use as various materials for which low thermal expansion characteristics and transparency are strictly required such, for example, as materials for optical parts, materials for large type telescope mirror blanks, materials for a ring laser gyroscope, materials for precision parts such as parts of a reference gauge for precision measurement and various electronic materials.

2. Description of the Related Art

Known in the art are low expansion transparent glass-ceramics formed by melting, heat-treating, and crystallizing a base glass of a $SiO_2$-$Al_2O_3$-$Li_2O$ system containing a nucleating agent. These glass-ceramics generally contain β-quartz solid solution as a main crystalline phase and have a coefficient of thermal expansion of ($\alpha \times 10^{-7}$/°C.) within a range of from −10 to +10.

Recent tendencies in the industry are that higher and more strict characteristics as described below are required for the materials used for the above described purposes:

(1) The base glass can be molten and refined easily so that the glass-ceramic substantially has little or no cord, foam or inclusion and has an optical homogeneity of a high degree.

(2) A coefficient of thermal expansion is $0 \pm 5 \times 10^{-7}$/°C. within the temperature range of from −60° C. to +160° C., and the maximal variation in a Δl/l curve (variation in relative length) which is represented by expansion and contraction of a material with respect to temperature change is 10 ppm or below.

(3) The crystal produced is fine and the glass-ceramic has an excellent transparency, particularly an excellent light transmissivity in the visible ray region.

(4) If the glass-ceramic contains $Na_2P$ and $K_2O$ ingredients, ions of these ingredients will diffuse to adversely affect properties of the glass-ceramic in the course of various processing such as film formation, washing and the like. Besides, these ingredients will increase the value of the coefficient of thermal expansion and variation in Δl/l of the glass-ceramic so that the glass-ceramic contains substantially little or no $Na_2O$ and $K_2O$ ingredients.

As one of the above described prior art low expansion transparent glass-ceramic, Japanese Patent Laid-open 77137/1991 discloses a low expansion transparent glass-ceramic product exhibiting the inherent thermal expansion behavior of a base glass of $SiO_2$-$Al_2O_3$-$Li_2O$-$ZnO$ system containing $TiO_2$ and $ZrO_2$ ingredients as nucleating agents, and optionally containing other ingredients such as $P_2O_5$, $MgO$, $CaO$, $Na_2O$, and $K_2O$. However, the MgO ingredient in these prior art glass-ceramics is lower than the minimal value specified by the present invention, besides there is no argument upon the particular properties within the extent restricted strictly by the present invention. Furthermore, all the glass compositions described in the examples of the specification contain $Na_2O$ ingredient, and the crystallization temperature of which is also the higher temperature of 850° C., so that this prior art glass-ceramic product does not meet the above described requirements. Moreover, although there is an argument as to the variation of a 1/1, the temperature range is narrower, i.e. from −60° C. to +100° C., so that the advantage to be attained by the conventional glass-ceramic product is insufficient, and hence the product does not meet also the above described requirement.

Furthermore, Japanese Patent Laid-open No. 92681/1994 discloses a transparent glass-ceramic of $SiO_2$-$Al_2O_3$-$Li_2O$-$MgO$-$ZnO$-$BaO$ system containing $TiO_2$ and $ZrO_2$ ingredients as nucleating agents. There is, however, no argument upon particular properties including CaO ingredient in the extent restricted strictly by the present invention.

Moreover, the U.S. Pat. No. 5,064,460 discloses a blue transparent glass-ceramic of $SiO_2$-$Al_2O_3$-$Li_2O$-$MgO$ system containing $TiO_2$ and $ZrO_2$ ingredients as nucleating agents. There is, however, no description of CaO and BaO ingredients.

Furthermore, the U.S. Pat. No. 3,928,229 discloses a transparent glass-ceramic for laser use of a $SiO_2$-$Al_2O_3$-$Li_2O$-$ZnO$-$Na_2O$ system containing $TiO_2$ and $ZrO_2$ ingredients as nucleating agents and further containing Nd. However, there is no description as to a BaO ingredient. With respect to alkaline earth oxides (MgO, ZnO, CaO, BaO), no argument upon the particular properties within the extent restricted strictly by the present invention. Besides the disclosed glass-ceramic contains $Na_2O$ ingredients, so that this prior art glass-ceramic does not meet the above described requirements of the present invention.

It is, therefore, an object of the present invention to provide a low expansion transparent glass-ceramic with improved properties, namely, having a reduced amount of 10 ppm or below in the maximal variation of Δl/l curve (variation in relative length) within a wide temperature range, and having a mere excellent optical homogeneity owing to improved melting and refining properties of the base glass without containing $Na_2O$ and $K_2O$ ingredients.

SUMMARY OF THE INVENTION

Accumulated studies and experiments made by the inventor of the present invention for achieving the above described object of the invention have resulted in a finding, which has led to the present invention, that a desired glass-ceramic which has a coefficient of thermal expansion of $0 \pm 5 \times 10^{-7}$/°C. within a wide temperature range of from −60° C. to +160° C., has a remarkably reduced (maximal variation with respect to relative length) of Δl/l curve of 10 ppm or less, has a more excellent optical homogeneity owing to reduced melting temperature in the base glass, and has an improved transparency can be obtained by restricting the ratio in weight of $P_2O_5$ to $SiO_2$ within a specific range and adding five components of $Li_2O$+$MgO$+$ZnO$ and $CaO$+$BaO$ of specific content ranges as essential ingredients in a base glass of a $SiO_2$-$P_2O_5$-$Al_2O_3$-$Li_2O$ system containing $TiO_2$ and $ZrO_2$ as nucleating agents.

The low expansion transparent glass-ceramic achieving the above described object of the invention is characterized in that the glass-ceramic is formed by subjecting to heat treatment a base glass comprising in weight percent:

| | |
|---|---|
| $SiO_2$ + $P_2O_5$ | 55–70% |
| in which $SiO_2$ | 50–62% |
| $P_2O_5$ | 5–10% |
| $Al_2O_3$ | 22–26% |
| $Li_2O$ | 3–5% |
| MgO | 0.6–2% |
| ZnO | 0.5–2% |
| CaO | 0.3–4% |
| BaO | 0.5–4% |
| $TiO_2$ | 1–4% |
| $ZrO_2$ | 1–4% |
| $As_2O_3$ | 0–2% | wherein a ratio of $P_2O_5$ to $SiO_2$ is between 0.08 and 0.20 in weight ratio, said glass-ceramic containing β-quartz solid solution as a main crystalline phase, having a coefficient of thermal expansion of $0\pm5\times10^{-7}/°C$. within the wide range of from −60° C. to +160° C., having a remarkably reduced (maximal variation with respect to relative length) of $\Delta l/l$ curve of 10 ppm or less, and having an improved optical homogeneity and a transparency.

In the above description and in the appended claims, the term "β-quartz" is used to designate comprehensively both β-quartz and β-eucryptite [$Li_2O.Al_2O_3.2SiO_2$ (where a part of $Li_2O$ can be substituted by MgO or ZnO)] which has a structure closely resembling β-quartz.

BRIEF DESCRIPTION OF THE DRAWING

The present invention will become more fully understood from the detailed description given hereinbelow and the accompanying drawing which is given by way of illustration only, and thus is not limitative of the present invention, and wherein:

FIG. 1 is a graphical representation indicating $\Delta l/l$ (variation in relative length) curves within a temperature range of from −60° C. to +160° C. in Example No. 7 according to the present invention and Comparative Example Nos. 1–3, respectively.

DETAILED DESCRIPTION OF THE INVENTION

The composition of oxides of the low expansion glass-ceramic according to the present invention is expressed by the composition of oxides of the above described glass. The above mentioned content ranges of the respective ingredients have been selected for the reasons stated below. In the following description, the content ranges of the respective ingredients are expressed in weight percent.

IF the amount of the $SiO_2$ ingredient is below 50%, the grain diameter of crystal in the produced glass-ceramic becomes too large with resulting deterioration in transparency. If the amount of $SiO_2$ ingredient exceeds 62%, melting and refining of the glass become difficult with resulting deterioration in the optical homogeneity of the glass-ceramic product. Accordingly, a preferable range is 50–60%, and particularly preferable is from 53 to 57%.

When the $P_2O_5$ ingredient is permitted to coexist with the $SiO_2$ ingredient, it enables the $\Delta l/l$ curve of the glass-ceramic to become more gradual and also to improve melting and refining properties of the glass. If, however, the amount of the $P_2O_5$ ingredient does not reach 5%, the above mentioned advantages cannot be obtained, while if the amount exceeds 10%, the grain diameter of crystal becomes too large with resulting deterioration in transparency to a significant extent. Accordingly, a preferable range is from 6 to 10%, and particularly preferable is from 7 to 9%. Furthermore, for the sake of achieving much more improvement of the above described advantages, it is advisable to keep the weight ratio of $P_2O_5$ ingredient to $SiO_2$ ingredient within a range of from 0.08 to 0.20 in the coexistence of the undermentioned $Li_2O+MgO+ZnO$ and CaO+BaO ingredients, a preferable range is from 0.1 to 0.17, and particularly preferable is 0.13 to 0.17.

If the amount of the $Al_2O_3$ ingredient is below 22%, difficulty arises in melting of the glass with resulting inferior stability to devitrification of the glass, while if the amount of this ingredient exceeds 26%, difficulty also arises in melting of the glass with resulting inferior stability to devitrification of the glass, and a particularly preferable range is from 23 to 25%.

The three ingredients of $Li_2O$, MgO, and ZnO are important ingredients for constituting crystals of β-quartz solid solution, and these three ingredients function to make more gradual and stabilize the $\Delta l/l$ curve of the glass-ceramic together with the above described restricted weight ratio of the $P_2O_5$ ingredient to the $SiO_2$ ingredient, besides function to improve melting and refining properties of the glass. In this connection, however, if the amount of $P_2O_5$ ingredient is below 3%, the melting property of the glass is deteriorated with resulting deterioration in the homogeneity of the product and difficulty in separating a required amount of crystal of a fine grain. If the amount of the $Li_2O$ ingredient exceeds 5%, the above described advantages cannot be obtained, and the grain diameter of crystal becomes too large with resulting deterioration in transparency of the glass-ceramic. Thus, a particularly preferable range of the amount of $Li_2O$ is from 3.7 to 4.5%.

If the amount of the MgO ingredient is below 0.6%, the above described advantages cannot be obtained, and the melting property is deteriorated with resulting deterioration in the homogeneity of the product, whereas if the amount of the MgO ingredient exceeds 2%, the above described advantages cannot be obtained, and it becomes difficult to cause a desired crystal phase to be produced in the glass-ceramic. Accordingly, the amount of the MgO ingredient is preferable within a range of from 0.7 to 1.4%.

If the amount of the ZnO ingredient is below 0.5%, the above described advantages cannot be obtained, and the melting property is deteriorated with resulting deterioration in the homogeneity of the product, whereas if the amount of the ZnO ingredient exceeds 2%, the above described advantages cannot be obtained, and stability to devitrification of the glass is deteriorated so that it becomes difficult to cause a desired crystal phase to be produced in the glass-ceramic. Accordingly, a particularly preferable range of the amount of the ZnO ingredient is from 0.5 to 1.5%.

In order to further elevate remarkably the above-mentioned advantages, the total amount of the three ingredients of $Li_2O+MgO+ZnO$ is preferably within a range of from 4.5–6.5%, and a particularly preferable range is from 5.0 to 6.0%.

The two ingredients of CaO and BaO are ingredients which remain essentially as the glass matrices other than the β-quartz solid solution crystal separated in the glass-ceramic, and are important as finely adjusting ingredients of crystal phase and glass matrix phase with respect to the above described advantages.

When the amount of the CaO ingredient is below 0.3%, the above described advantages cannot be obtained, while when the amount of the CaO ingredient exceeds 4%, the above-mentioned advantages cannot also be obtained with resulting deterioration of stability to devitrification of the glass. Thus, the amount of the CaO ingredient is particularly preferable within a range of from 0.5 to 2.5%.

If the amount of the BaO ingredient is below 0.5%, the above described advantages cannot be obtained, whereas if the amount of BaO ingredient exceeds 4%, the melting property and stability to devitrification of the glass are both deteriorated, so that a preferable range of the amount of BaO ingredient is from 0.5 to 3%, and a particularly preferable range is from 0.5 to 1.5%.

To further remarkably improve the above described advantages, it is preferable to maintain the total amount of the two ingredients of CaO+BaO within a range of from 1–5%, and particularly preferable is from 1.5 to 2.5%.

The $TiO_2$ and $ZrO_2$ ingredients are indispensable as nucleating agents. If the amount of each of these ingredients is below 1%, a desired crystal cannot be separated, whereas if the amount of each of these ingredients exceeds 4%, transparency of the glass-ceramic is deteriorated, and stability to devitrification of the glass is deteriorated. A particularly preferable range of the amount of the $TiO_2$ is from 1.5 to 3.0%, while that of the $ZrO_2$ is within a range of from 1.0 to 2.5%.

Furthermore, it is preferred that the total amount of these two ingredients of $TiO_2+ZrO_2$ is within a range of from 2.5 to 5.0%, and a particularly preferable range is from 3.5 to 5.0%.

The $As_2O_3$ ingredient may be optionally added as a refining agent in melting the glass for obtaining a homogeneous product, and the amount of 2% or below of the $As_2O_3$ ingredient will be sufficient for achieving this purpose.

In addition to the above described ingredients, one or more of PbO, SrO, $B_2O_3$, $F_2$, $La_2O_3$, $Bi_2O_3$, $WO_3$, $Y_2O_3$, $Gd_2O_3$, and $SnO_2$ ingredients may be added up to the amount of 2% in total and one or more of coloring ingredients such as CoO, NiO, $MnO_2$, $Fe_2O_3$, and $Cr_2O_3$ may be added up to the amount of 2% in total, respectively, within the range in which desired properties of the glass-ceramic according to the present invention will not be impaired.

EXAMPLES

Examples of the low expansion glass-ceramic of the present invention will now be described in comparison with Comparative Examples. Table 1 shows, with regard to examples of composition of the low expansion transparent glass-ceramic of the present invention (Examples No. 1 to No.12) and comparative examples of composition of the prior art low expansion glass-ceramic (Comparative Examples No. 1 to No. 3), melting temperatures and time of the glass, nucleating temperatures and time as well as crystallization temperatures and time as crystallizing conditions of the glass, and further coefficients of thermal expansion ($\alpha \times 10^{-7}/°C.$) within the temperature range of from $-60°$ C. to $+160°$ C. and $\Delta l/l$ curve (maximal variation of relative length) (ppm) of the resulting glass-ceramic. Table 1 shows also wavelengths (nm) of light producing light transmissivity of 80% in a specimen with two polished surfaces having thickness of 5 mm of the glass-ceramics.

The measurement of the melting conditions was made in accordance with a measuring method according to which materials such as oxides, carbonates, and nitrates are measured and mixed so as to provide glass of 2500 grams, these materials are put in a platinum crucible in a furnace which has previously been adjusted in heating temperature depending upon ease or difficulty in melting of the materials due to the composition and are molten while being stirred, and the state of the glass until it reaches a substantially defoamed state is observed with the naked eye.

As a result of X-ray analysis, all the glass-ceramics of the examples shown in Table 1 have been found to contain β-quartz solid solution as a predominant crystal phase.

TABLE 1

| | | Examples | | |
|---|---|---|---|---|
| | | 1 | 2 | 3 |
| glass composition (in weight %) | $SiO_2$ | 55.0 | 54.5 | 55.0 |
| | $P_2O_5$ | 6.0 | 6.5 | 7.5 |
| | $Al_2O_3$ | 26.0 | 25.0 | 24.0 |
| | $Li_2O$ | 3.9 | 3.5 | 3.8 |
| | MgO | 1.4 | 1.5 | 1.6 |
| | ZnO | 1.0 | 1.4 | 0.7 |
| | CaO | 1.6 | 2.0 | 1.2 |
| | BaO | 1.5 | 1.1 | 1.7 |
| | $TiO_2$ | 1.6 | 1.8 | 2.0 |
| | $ZrO_2$ | 1.0 | 1.7 | 1.5 |
| | $As_2O_3$ | 1.0 | 1.0 | 1.0 |
| | $Na_2O$ | | | |
| | $P_2O_5/SiO_2$ | 0.11 | 0.12 | 0.14 |
| | $Li_2O + MgO + ZnO$ | 6.3 | 6.4 | 6.1 |
| | $CaO + BaO$ | 3.1 | 3.1 | 2.9 |
| Crystallizing conditions | nucleating temperature (°C.) | 720 | 750 | 700 |
| | nucleation time (Hr) | 4 | 1 | 15 |
| | Crystallization temperature (°C.) | 820 | 840 | 760 |
| | Crystallization time (Hr) | 6 | 1 | 25 |
| Coefficient of thermal expansion $\alpha \times 10^{-7}/°C.$ ($-60°$ C. ~ $+160°$ C.) | | +1.25 | −2.42 | +3.01 |
| maximal variation in $\Delta l/l$ relative length (ppm) | | 7.6 | 8.2 | 8.9 |
| 5 m/mt $T_{80}$ (nm) | | 435 | 441 | 431 |
| melting temperature (°C.) | | 1500 | 1500 | 1500 |
| melting time (Hr) | | 8 | 8 | 8 |

| | | Examples | | |
|---|---|---|---|---|
| | | 4 | 5 | 6 |
| glass composition (in weight %) | $SiO_2$ | 56.0 | 57.0 | 57.0 |
| | $P_2O_5$ | 8.0 | 8.5 | 8.7 |
| | $Al_2O_3$ | 24.0 | 23.0 | 22.0 |
| | $Li_2O$ | 3.9 | 3.9 | 4.2 |
| | MgO | 0.8 | 0.6 | 1.3 |
| | ZnO | 0.6 | 0.6 | 0.6 |
| | CaO | 1.0 | 0.7 | 0.9 |
| | BaO | 0.7 | 0.6 | 0.7 |
| | $TiO_2$ | 2.2 | 2.3 | 2.1 |
| | $ZrO_2$ | 1.8 | 1.8 | 1.5 |
| | $As_2O_3$ | 1.0 | 1.0 | 1.0 |
| | $Na_2O$ | | | |
| | $P_2O_5/SiO_2$ | 0.14 | 0.15 | 0.15 |
| | $Li_2O + MgO + ZnO$ | 5.3 | 5.1 | 6.1 |
| | $CaO + BaO$ | 1.7 | 1.3 | 1.7 |
| Crystallizing conditions | nucleating temperature (°C.) | 660 | 660 | 700 |
| | nucleation time (Hr) | 5 | 10 | 10 |
| | Crystallization temperature (°C.) | 780 | 770 | 790 |
| | Crystallization time (Hr) | 2 | 20 | 10 |
| Coefficient of thermal expansion $\alpha \times 10^{-7}/°C.$ ($-60°$ C. ~ $+160°$ C.) | | +0.03 | −0.03 | +0.15 |
| maximal variation in $\Delta l/l$ relative length (ppm) | | 6.4 | 7.0 | 9.8 |
| 5 m/mt $T_{80}$ (nm) | | 415 | 418 | 428 |
| melting temperature (°C.) | | 1520 | 1520 | 1520 |
| melting time (Hr) | | 8 | 8 | 8 |

| | | Examples | | |
|---|---|---|---|---|
| | | 7 | 8 | 9 |
| glass composition (in weight %) | $SiO_2$ | 55.0 | 54.5 | 55.0 |
| | $P_2O_5$ | 8.0 | 8.5 | 8.0 |
| | $Al_2O_3$ | 24.0 | 24.0 | 24.0 |
| | $Li_2O$ | 4.0 | 4.0 | 4.0 |
| | MgO | 1.0 | 1.0 | 1.0 |
| | ZnO | 0.5 | 0.5 | 0.6 |
| | CaO | 1.0 | 1.0 | 0.8 |
| | BaO | 1.0 | 1.0 | 1.2 |
| | $TiO_2$ | 2.5 | 2.5 | 2.4 |
| | $ZrO_2$ | 2.0 | 2.0 | 2.0 |
| | $As_2O_3$ | 1.0 | 1.0 | 1.0 |
| | $Na_2O$ | | | |
| | $P_2O_5/SiO_2$ | 0.15 | 0.16 | 0.15 |
| | $Li_2O + MgO + ZnO$ | 5.5 | 5.5 | 5.6 |
| | $CaO + BaO$ | 2.0 | 2.0 | 2.0 |
| Crystallizing conditions | nucleating temperature (°C.) | 680 | 700 | 670 |
| | nucleation time (Hr) | 5 | 20 | 20 |

TABLE 1-continued

|  |  |  |  |  |
|---|---|---:|---:|---:|
|  | Crystallization temperature (°C.) | 800 | 780 | 800 |
|  | Crystallization time (Hr) | 5 | 20 | 10 |
| Coefficient of thermal expansion $\alpha \times 10^{-7}$/°C. ($-60°$ C. ~ $+160°$ C.) |  | +0.32 | +0.10 | −0.53 |
| maximal variation in $\Delta$ 1/1 relative length (ppm) |  | 9.5 | 9.0 | 8.3 |
| 5 m/mt $T_{80}$ (nm) |  | 423 | 421 | 418 |
| melting temperature (°C.) |  | 1510 | 1510 | 1510 |
| melting time (Hr) |  | 8 | 8 | 8 |

|  |  | Examples |  |  |
|---|---|---:|---:|---:|
|  |  | 10 | 11 | 12 |
| glass composition (in weight %) | SiO₂ | 55.0 | 54.2 | 55.0 |
|  | P₂O₅ | 8.3 | 7.5 | 8.0 |
|  | Al₂O₃ | 23.8 | 24.5 | 24.0 |
|  | Li₂O | 4.0 | 4.0 | 4.0 |
|  | MgO | 0.8 | 1.2 | 0.8 |
|  | ZnO | 0.5 | 0.7 | 0.5 |
|  | CaO | 1.0 | 1.2 | 1.2 |
|  | BaO | 1.2 | 1.2 | 1.0 |
|  | TiO₂ | 2.4 | 2.5 | 2.5 |
|  | ZrO₂ | 2.0 | 2.0 | 2.0 |
|  | As₂O₃ | 1.0 | 1.0 | 1.0 |
|  | Na₂O |  |  |  |
|  | P₂O₅/SiO₂ | 0.15 | 0.14 | 0.15 |
|  | Li₂O + MgO + ZnO | 5.3 | 5.8 | 5.3 |
|  | CaO + BaO | 2.2 | 2.4 | 2.2 |
| Crystallizing conditions | nucleating temperature (°C.) | 690 | 660 | 700 |
|  | nucleation time (Hr) | 40 | 40 | 40 |
|  | Crystallization temperature (°C.) | 770 | 760 | 780 |
|  | Crystallization time (Hr) | 15 | 40 | 40 |
| Coefficient of thermal expansion $\alpha \times 10^{-7}$/°C. ($-60°$ C. ~ $+160°$ C.) |  | +0.82 | +1.21 | +0.05 |
| maximal variation in $\Delta$ 1/1 relative length (ppm) |  | 8.1 | 9.8 | 8.6 |
| 5 m/mt $T_{80}$ (nm) |  | 414 | 429 | 425 |
| melting temperature (°C.) |  | 1510 | 1500 | 1500 |
| melting time (Hr) |  | 8 | 8 | 8 |

|  |  | Comparative Examples |  |  |
|---|---|---:|---:|---:|
|  |  | 1 | 2 | 3 |
| glass composition (in weight %) | SiO₂ | 61.0 | 55.5 | 53.0 |
|  | P₂O₅ |  | 7.9 | 8.0 |
|  | Al₂O₃ | 24.0 | 25.3 | 23.5 |
|  | Li₂O | 4.3 | 3.7 | 3.8 |
|  | MgO | 2.7 | 1.0 |  |
|  | ZnO | 1.0 | 1.4 | 1.8 |
|  | CaO |  |  | 2.0 |
|  | BaO | 1.5 |  | 2.5 |
|  | TiO₂ | 2.3 | 2.3 | 2.3 |
|  | ZrO₂ | 2.2 | 1.9 | 1.4 |
|  | As₂O₃ | 1.0 | 0.5 | 0.8 |
|  | Na₂O |  | 0.5 | 0.7 |
|  | P₂O₅/SiO₂ | — | 0.14 | 0.15 |
|  | Li₂O + MgO + ZnO | 8.0 | 6.1 | — |
|  | CaO + BaO | — | — | 4.5 |
| Crystallizing conditions | nucleating temperature (°C.) | 700 | 730 | 730 |
|  | nucleation time (Hr) | 5 | 5 | 5 |
|  | Crystallization temperature (°C.) | 800 | 850 | 850 |
|  | Crystallization time (Hr) | 5 | 5 | 5 |
| Coefficient of thermal expansion $\alpha \times 10^{-7}$/°C. ($-60°$ C. ~ $+160°$ C.) |  | +2.50 | −0.62 | −0.13 |
| maximal variation in $\Delta$ 1/1 relative length (ppm) |  | 75.5 | 17.0 | 20.0 |
| 5 m/mt $T_{80}$ (nm) |  | 424 | 452 | 461 |
| melting temperature (°C.) |  | 1500 | 1650 | 1630 |
| melting time (Hr) |  | 8 | 12 | 8 |

As shown in Table 1, the melting condition of the glasses of the examples shown is 1520° C. or below for 8 hours. This melting condition is advantageous in that little dissipation of volatile ingredients such as Li₂O, and P₂O₅ occurs and is much superior to the melting condition of the glasses of the comparative examples (No. 2, and No. 3) which is 1630° C. to 1650° C. for 8 to 12 hours. Thus, the homogeneity of the glass-ceramic of the present invention is superior to the prior art glass-ceramics. As regards the value of Δ1/1 (maximal variation in relative length), the comparative examples exhibit large values of 17.0 to 75.5 ppm whereas the examples of the present invention exhibit much smaller values of 6.4 to 9.8 ppm. Thus, it will be understood that the glass-ceramic of the present invention has little variation in the Δ1/1 (maximal variation in relative length) due to temperature change and therefore is much more stable than the prior art glass-ceramics. Furthermore, the Δ1/1 curves are shown in FIG. 1 with respect to these comparative examples No. 1–No. 3 and the example No. 7 of the present invention. As is understood from FIG. 1, the Δ1/1 curve of the example No. 7 of the invention due to temperature change is more gradual and stable than that of the comparative examples No. 1–No. 3.

Furthermore, in light transmissivity ($T_{80}$) also, the comparative examples exhibit values of 452 nm or over whereas the examples of the present invention exhibit values within the range of from 415 nm to 441 nm and, accordingly, little coloring or opaqueness takes place in the glass-ceramic of the present invention and transparency thereof is much superior to the prior art glass-ceramics.

As described in the foregoing, according to the low expansion glass-ceramic of the present invention, by restricting the ratio in weight of P₂O₅ to SiO₂ within a specific range and adding four ingredients of MgO, ZnO, BaO, and CaO of specific content ranges as essential ingredients in a glass of SiO₂-P₂O₅Al₂O₃-Li₂O system containing TiO₂ and ZrO₂ as nucleating agents, the glass-ceramic obtained has the above described low coefficients of thermal expansion, has a remarkably reduced Δ1/1 (maximal variation in relative length) with respect to temperature change, and has excellent transparency.

It will be appreciated by those of ordinary skill in the art that the present invention can be embodied in other specific forms without departing from the spirit or essential characteristics thereof.

The presently disclosed examples are therefore considered in all respects to be illustrative and not restrictive. The scope of the invention is indicated by the appended claims rather than the foregoing description, and all changes that come within the meaning and range of equivalents thereof are intended to be embraced therein.

What is claimed is:

1. A low expansion transparent glass-ceramic formed by subjecting to heat treatment a glass consisting in weight percent of:

SiO₂+P₂O₅ 55–70% in which SiO₂ 50–62%

P₂O₅ 6–10%

Al₂O₃ 22–26%

Li₂O 3–5%

MgO 0.6–2%

ZnO 0.5–2%

CaO 0.3–4%

BaO 0.5–4%

TiO$_2$ 1–4%
ZrO$_2$ 1–4%
As$_2$O$_3$ 0–2% wherein the ratio in weight of P$_2$O$_5$ to SiO$_2$ is between 0.08 and 0.02, said glass-ceramic containing β-quartz solid solution as a main crystalline phase, said glass-ceramic having a coefficient of thermal expansion of 0±5×10$^{-7}$/°C. within a temperature range of from −60° C. to +160° C., and a maximal variation of Δl/l curve (variation in relative length) of 10ppm or less.

2. A low expansion transparent glass-ceramic as defined in claim 1, consisting in weight percent of:

| | |
|---|---|
| SiO$_2$ + P$_2$O$_5$ | 56–65% |
| in which SiO$_2$ | 50–60% |
| P$_2$O$_5$ | 6–10% |
| Al$_2$O$_3$ | 22–26% |
| Li$_2$O + MgO + ZnO | 4.5–6.5% |
| in which Li$_2$O | 3–5% |
| MgO | 0.6–2% |
| ZnO | 0.5–2% |
| CaO + BaO | 1–5% |
| in which CaO | 0.3–4% |
| BaO | 0.5–3% |
| TiO$_2$ + ZrO$_2$ | 2.5–5% |
| in which TiO$_2$ | 1–4% |
| ZrO$_2$ | 1–4% |
| As$_2$O$_3$ | 0–2% | wherein a ratio in weight of P$_2$O$_5$ to SiO$_2$ is between 0.10 and 0.17.

3. A low expansion transparent glass-ceramic as defined in claim 1, consisting in weight percent of:

| | |
|---|---|
| SiO$_2$ + P$_2$O$_5$ | 60–65% |
| in which SiO$_2$ | 53–57% |
| P$_2$O$_5$ | 7–9% |
| Al$_2$O$_3$ | 23–25% |
| Li$_2$O + MgO + ZnO | 5.0–6.0% |
| in which Li$_2$O | 3.7–4.5% |
| MgO | 0.7–1.4% |
| ZnO | 0.5–1.5% |
| CaO + BaO | 1.5–2.5% |
| in which CaO | 0.5–2.5% |
| BaO | 0.5–1.5% |
| TiO$_2$ + ZrO$_2$ | 3.5–5.0% |
| in which TiO$_2$ | 1.5–3.0% |
| ZrO$_2$ | 1.0–2.5% |
| As$_2$O$_3$ | 0–2% | wherein a ratio in weight of P$_2$O$_5$ to SiO$_2$ is between 0.13 and 0.17.

4. A low expansion transparent glass-ceramic as defined in claim 1 which is prepared by melting, forming, and annealing said glass raw material, and thereafter subjecting to heat treatment the resulting base glass under such heat-treating conditions that the nucleation temperature is between 650° C. and 750° C., and the crystallization temperature is between 750° C. and 840° C.

* * * * *

UNITED STATES PATENT AND TRADEMARK OFFICE
CERTIFICATE OF CORRECTION

PATENT NO. : 5,591,682
DATED : January 7, 1997
INVENTOR(S) : Naoyuki Goto It is certified that error appears in the above-identified patent and that said Letters Patent is hereby corrected as shown below:

Column 1, line 41, "$Na_2P$" should be --$Na_2O$--.

Signed and Sealed this

Eighteenth Day of November 1997

*Attest:*

BRUCE LEHMAN

*Attesting Officer*    *Commissioner of Patents and Trademarks*

UNITED STATES PATENT AND TRADEMARK OFFICE
CERTIFICATE OF CORRECTION

PATENT NO. : 5,591,682
DATED : January 7, 1997
INVENTOR(S) : Naoyuki Goto

It is certified that error appears in the above-identified patent and that said Letters Patent is hereby corrected as shown below:

Column 9,
Line 5, "0.02" should read -- 0.20 --.

Signed and Sealed this

Eighteenth Day of October, 2005

JON W. DUDAS
*Director of the United States Patent and Trademark Office*